United States Patent [19]

Clark et al.

[11] 4,311,443
[45] Jan. 19, 1982

[54] MOTOR/PUMP TRANSMISSION CONSTRUCTION FOR A MOINEAU TYPE APPARATUS

[75] Inventors: Wallace Clark; Albert S. Goldstein, Jr., both of Indianapolis, Ind.

[73] Assignee: Oncor Corporation, Houston, Tex.

[21] Appl. No.: 45,242

[22] Filed: Jun. 4, 1979

Related U.S. Application Data

[63] Continuation-in-part of Ser. No. 958,647, Nov. 8, 1978, abandoned, which is a continuation-in-part of Ser. No. 878,814, Feb. 17, 1978, abandoned.

[51] Int. Cl.³ .................. F03C 2/22; F16D 3/04; E21B 4/02
[52] U.S. Cl. .................... 418/48; 74/86; 64/31; 175/107
[58] Field of Search .......... 418/48, 182; 74/86; 175/107; 64/31

[56] References Cited

U.S. PATENT DOCUMENTS

| 1,425,026 | 8/1922 | Lower | 74/86 |
|---|---|---|---|
| 2,188,938 | 2/1940 | Brown et al. | 74/86 |
| 3,244,014 | 4/1966 | Hamaker | 74/86 |
| 3,377,873 | 4/1968 | Patterson, Jr. | 74/86 |
| 3,603,407 | 9/1971 | Clark | 418/48 |
| 3,627,453 | 12/1971 | Clark | 418/48 |
| 3,765,687 | 10/1973 | Weiss | 74/86 |
| 4,011,917 | 3/1977 | Tiraspolsky et al. | 418/48 |
| 4,080,115 | 3/1978 | Sims et al. | 418/48 |
| 4,221,552 | 9/1980 | Clark | 418/48 |

FOREIGN PATENT DOCUMENTS

1944562  3/1971  Fed. Rep. of Germany ........ 418/48

Primary Examiner—John J. Vrablik
Attorney, Agent, or Firm—Frost & Jacobs

[57] ABSTRACT

There is disclosed a transmission between an orbiting element and an element rotating on its own centers. It is disclosed particularly in connection with a motor operating on the Moineau principle and the invention replaces the conventional connecting rod with double universal joints and it also can modify the ball and tube arrangement disclosed in earlier patents.

3 Claims, 15 Drawing Figures

MOTOR/PUMP TRANSMISSION CONSTRUCTION FOR A MOINEAU TYPE APPARATUS

CROSS REFERENCE TO RELATED APPLICATION

This application is a continuation-in-part of an application in the names of Wallace Clark and Albert S. Goldstein, Jr., Ser. No. 958,647, filed Nov. 8, 1978, which was a continuation-in-part of an application Ser. No. 878,814 filed Feb. 17, 1978, entitled "Motor Transmission Construction" and both now abandoned.

BACKGROUND OF THE INVENTION

Motors operating upon the principles invented by R. J. L. Moineau many years ago are now quite well known. In all cases, these involve an outer member having internal helical threads and an inner member having external helical threads with the outer member having one more internal helical thread than the external helical threads on the inner member. Thus, if the outer member is held stationary or is caused to rotate on its own axis, the inner member will gyrate within the outer member. If the rotation of the inner member is to be transmitted to a shaft running on true centers, or if the inner member is to be driven by a shaft running on true centers, then it is necessary to provide between the inner member of the motor or pump and the input or output shaft, which is running on true centers, a connecting rod with a universal joint at each end. This construction is shown in many of the earlier R. J. L. Moineau patents.

In earlier patents of Wallace Clark, e.g. U.S. Pat. No. 3,932,072 dated Jan. 13, 1976 and No. 3,951,097 dated Apr. 20, 1976, and No. 4,051,910 dated Oct. 4, 1977, and No. 4,059,165 dated Nov. 22, 1977, various ways of avoiding the double universal joint and connecting rods are disclosed. These patents teach the use of a ball and tube wherein the ball is secured to the end of the internal member of the motor or pump extending at right angles to the axis of the inner member, and is constrained to operate within a tube or between a pair of cheeks. According to these patents, the effective eccentricity is removed from the drive train and the power of a ball arm is used to hold or to drive a concentrically supported hollow shaft as, for example, in a water swivel.

With this arrangement, the ball follows an elliptical path and does not spin as it rotates in the tube or in the half tube or between cheeks, and it cannot cross the axis of the motor.

BRIEF SUMMARY OF THE INVENTION

According to the present invention, not only is the connecting rod and double universal joint eliminated, but also the ball arm extending at right angles to the inner member and operating in a tube or between cheeks (or within a half tube).

All these prior art devices are replaced by either a ball or a cylinder, either of which may be solid and may be covered with a bearing sleeve and cap to take thrust wear, extending coaxially from the lathe axis of the inner member and operating between cheeks, or within a box secured to, or forming part of a drive plate. According to this concept, the inner member turns without transmitting any power; but power is produced only by its gyration and theoretically the ball or cylinder operates in the same spot in the half tube or between the cheeks, or within the box. Thus, the rotating power of a Moineau motor is generated in a direction opposite to the rotation of the inner member. According to the present invention, the offset arm is eliminated and the driving member is disposed on the centerline of the lathe center of the inner member. The bearing can be a sealed lubricated bearing, with a more suitable lubrication than drilling mud, by having a double shell around the driving cylinder so that the surface of the cylinder does not turn in the square half tube.

The tail end of the inner member can likewise be radially supported in a manner somewhat similar to what is shown and described in connection with the head of the inner member. The mounting of the ball on the tail end of the rotor is a bit more difficult because of the necessity of modifications in order to make possible assembly of the device.

BRIEF DESCRIPTION OF THE SEVERAL VIEWS OF THE DRAWING

FIG. 7 is a view on a smaller scale showing the supporting arrangement for the tail end of the inner member.

DETAILED DESCRIPTION

As indicated above, in situations where an internal helical gear pair according to the Moineau disclosures working either as a pump or as a motor, and the internal element of the gear pair in its rotation gyrates and this gyratory and rotating member has to be connected to a member running on its own centers, it has always been necessary to use a connecting rod with a universal joint at each end thereof. This can be clearly seen, for example, in FIG. 4 of the Clark et al U.S. Pat. No. 3,112,801. These double universal joints were subject to failure and all sorts of problems and it was not until the Clark U.S. Pat. No. 3,932,072 that an alternate to the connecting rod was taught. This involved an arm secured to the rotary internal member which also orbits or gyrates, and has secured to it a ball or a cylinder which operates in a tube. This construction made use of the power of the ball arm to hold or to drive a concentrically supported hollow shaft as, for example, in a water swivel. This sort of thing is clearly shown in the Clark U.S. Pat. No. 3,951,097 and in Clark U.S. Pat. No. 4,051,910 and in Clark Patent No. 4,059,165. The transmission of torque is provided by the ball arm and the gyration of the member to which the ball arm is secured is taken care of by the reciprocation of the ball in the tube. That arrangement reduced the effect of the inherent eccentricity of the inner member of the helical gear pair.

According to the present invention, instead of trying to reduce or discard this eccentricity, the eccentricity alone is used to transmit torque.

Figure 1:
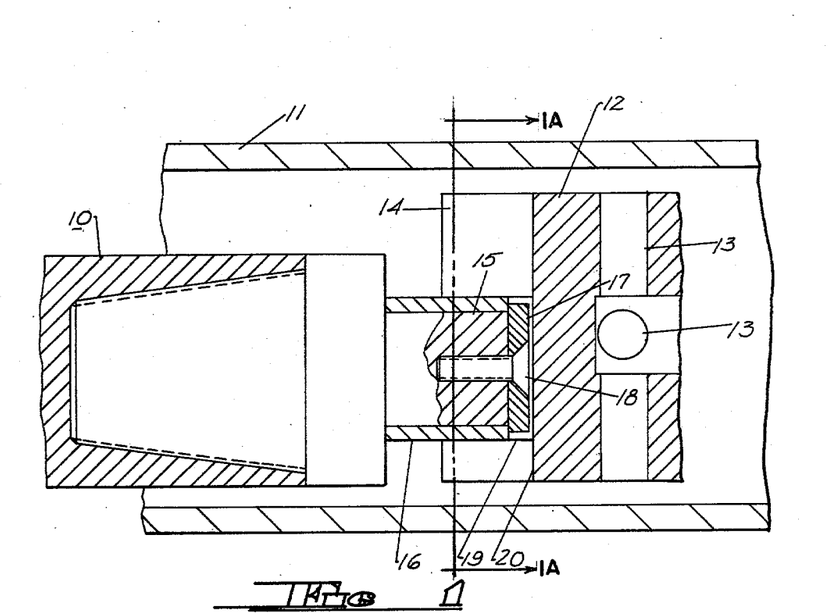
FIG. 1 is a fragmentary longitudinal cross sectional view showing one embodiment of the transmission construction of the present invention.
Figure 1A:
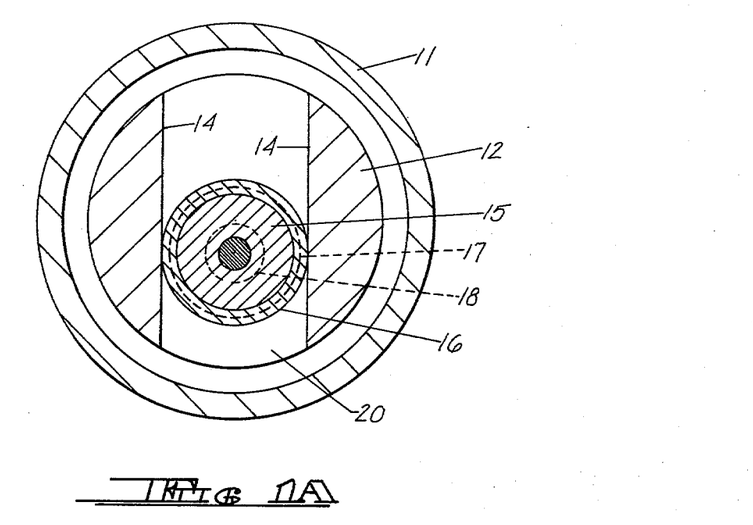
FIG. 1A is a cross sectional view on the line 1A—1A of FIG. 1.

Referring first to FIG. 1, the numeral 10 generally designates the rotor head at the end of the inner element of a Moineau type gear pair. Its position off the centerline of the drill pipe 11 demonstrates the eccentricity of the rotor head 10.

According to the present invention, the drill bit is attached to a shaft 12a terminating at its upper end in a driving wheel 12. This driving wheel is provided with holes 13 for the passage of lubricants (i.e., drilling mud) and it will be provided with a pair of cheeks which are parallel planes, one of which is indicated at 14.

Secured to the rotor head 10 on its lathe axis will be a cylinder 15 and a sleeve bearing 16 will be held in position on the cylinder 15 by means of a cap 17 fastened into the member 15 for example by means of the screw 18.

Since the stator member of the helical gear pair within which the rotor terminating in the head 10 rotates and orbits is generally of rubber or similar material, misalignment can occur and for this reason, and to allow for freedom of movement, the spacing between the cheeks 14 is preferably very slightly larger than the outside diameter of the sleeve 16. This, along with the radial freedom provided by the cheek arrangement, takes care of any possible misalignment.

From the foregoing description, it will be clear that as the inner member or rotor of the helical gear pair rotates and gyrates as is common in Moineau type gear pairs, the cylinder 15 will describe theoretically a circular path within the drill pipe 11 and as it describes this path it will bear against one or the other of the cheeks 14, depending upon the direction of rotation, and will transmit torque from the member 10 to the driving wheel 12. The sleeve 16 is free to rotate on the cylinder 15 and a cap 19 will provide a thrust bearing against the bottom 20 of the slot between the cheeks 14.

Figure 2:
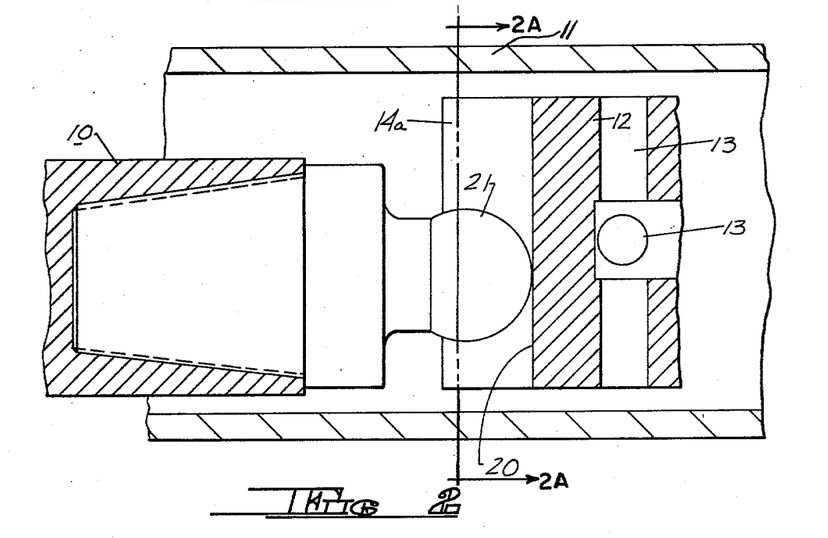
FIG. 2 is a view similar to FIG. 1 showing another embodiment thereof.
Figure 2A:
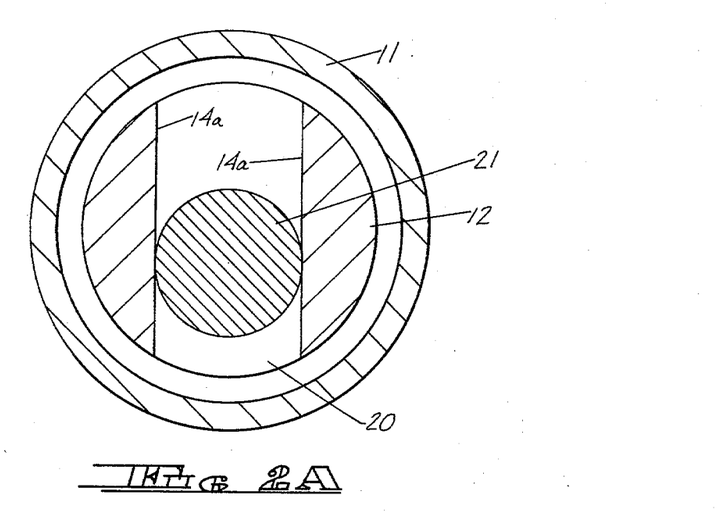
FIG. 2A is a cross sectional view on the line 2A—2A of FIG. 2.

In FIG. 2 there is shown a slightly modified embodiment of the invention wherein instead of the cylinder 15 with its bearing sleeve 16, there is provided a ball 21 and the cheeks 14 of FIG. 1 are replaced by a half cylinder 14a in FIG. 2. The bottom of the half cylinder is again indicated at 20. The axis of the ball 21 again is on the lathe axis of the rotor member which terminates in the rotor head 10.

Figure 3:
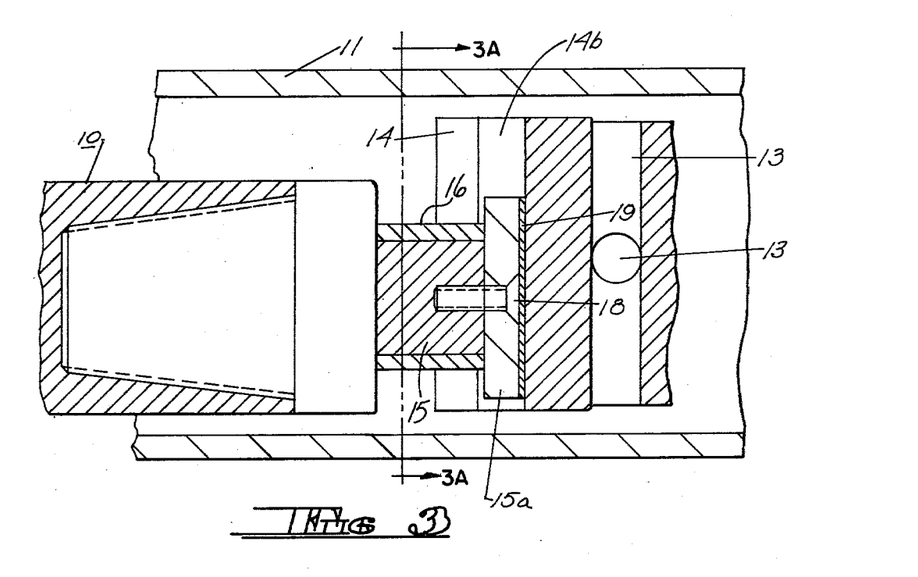
FIG. 3 is a view similar to FIGS. 1 and 2 showing another embodiment thereof.
Figure 3A:
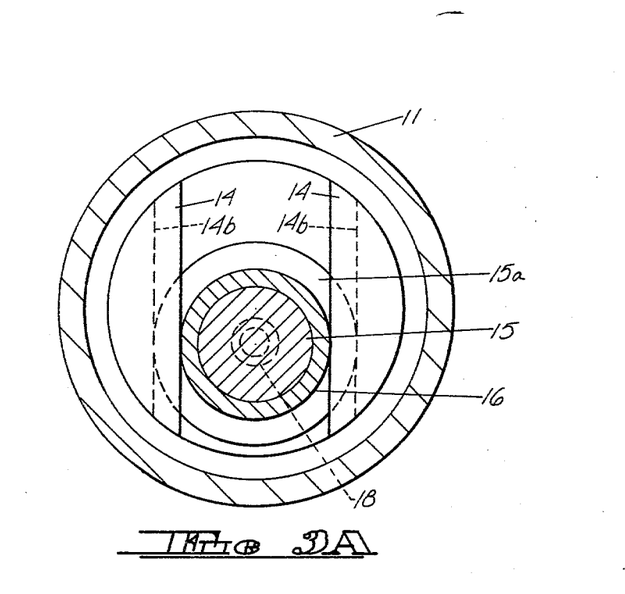
FIG. 3A is a cross sectional view taken on the line 3A—3A of FIG. 3.

If it is determined to be necessary to prevent the cylinder 15 of FIG. 1 from being withdrawn from between the cheeks 14, the member 15 may terminate in a T configuration, as is clearly shown in FIG. 3. In this case the cheeks 14 are undercut as at 14b to fit the extensions 15a on the member 15. It will be understood that the undercuts 14b extend entirely across the drive plate 14, so that the rotor head and associated parts may be assembled to, or disassembled from the drive plate.

Figure 4:
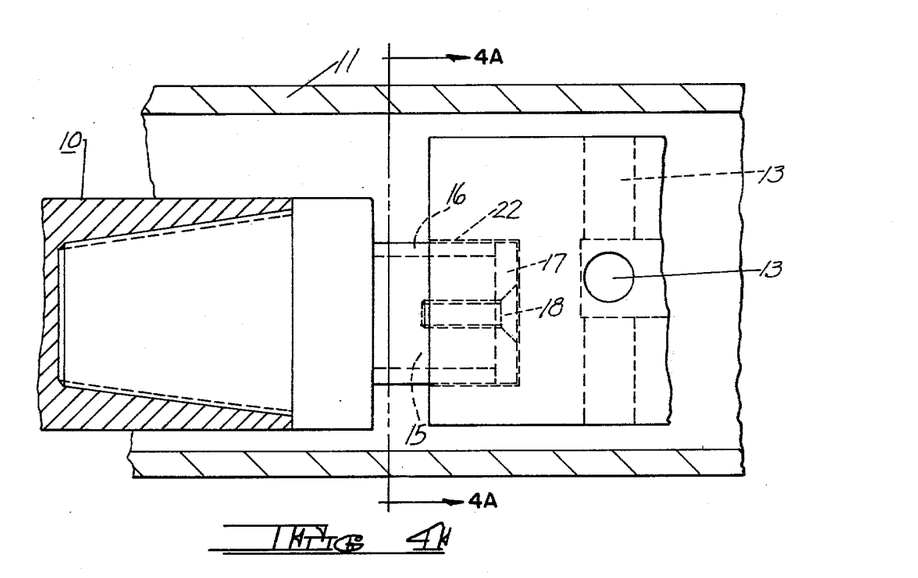
FIG. 4 is a view similar to FIG. 1 showing the use of a box rather than cheeks.
Figure 4A:
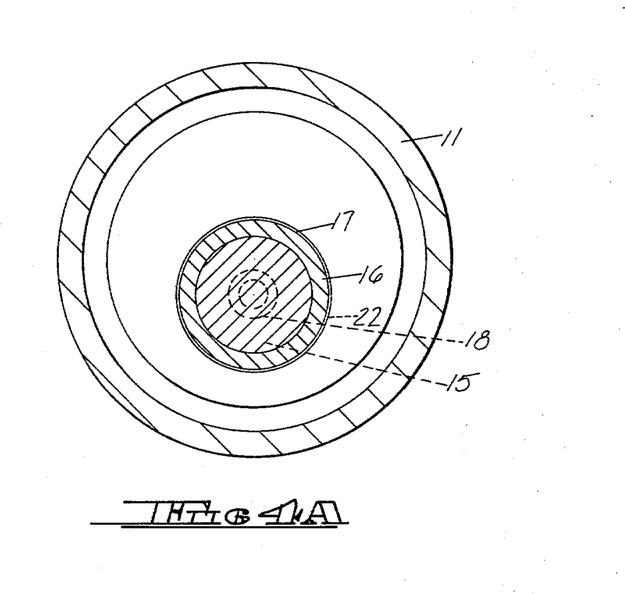
FIG. 4A is a cross sectional view taken on the line 4A—4A of FIG. 4.

If the exigencies of the use to which the invention is being put requires greater support for the driving member 15, 15a or 21, the slots formed by the cheeks 14, 14a and 14b may be substituted by what may be referred to as a box. Such a box is indicated in FIG. 4 at 22. In the case of the cylindrical driving element 15, the box may be a cylindrical box of a diameter slightly larger than that of the sleeve 16 surrounding the driving element 15.

Figure 5:
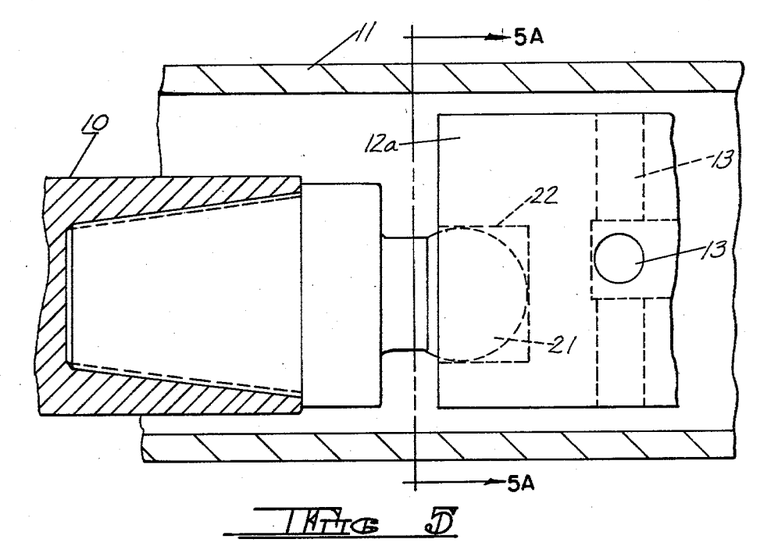
FIG. 5 is a view similar to FIG. 2 showing the use of a box in connection with a ball rather than the cheeks of FIG. 2.
Figure 5A:
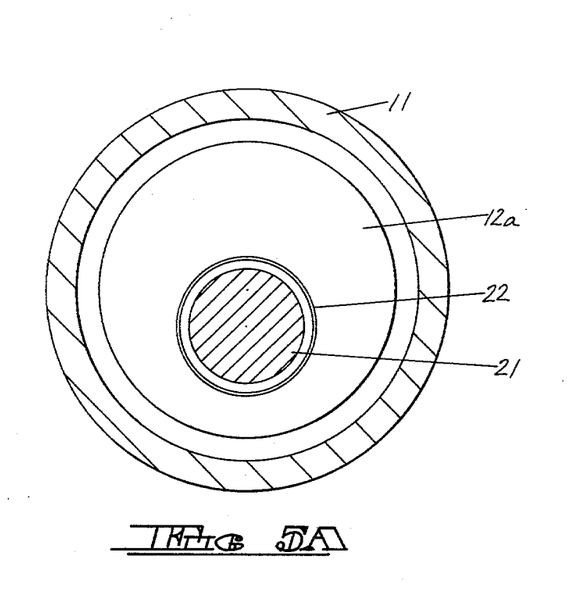
FIG. 5A is a cross sectional view taken on the line 5A—5A of FIG. 5.

Similarly in FIG. 5, the box 22 may be cylindrical or hemispherical if desired, of a diameter slightly larger than the ball 21.

Figure 6:
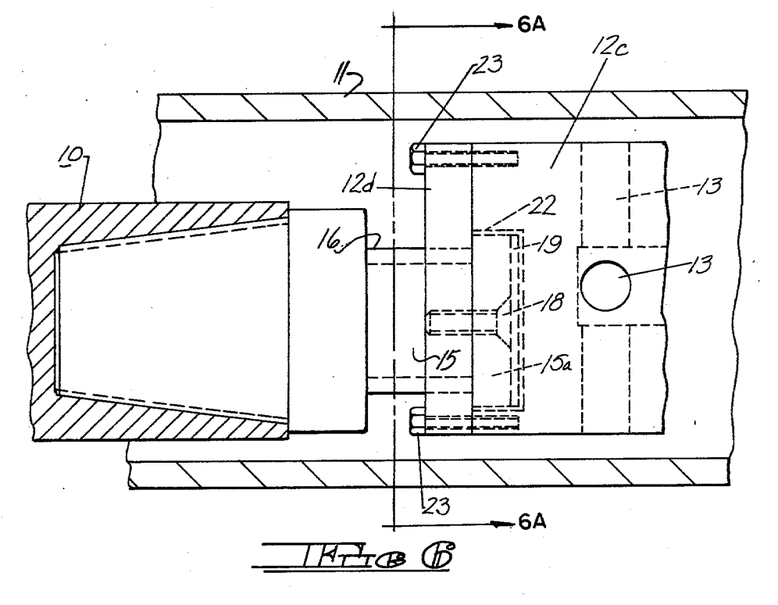
FIG. 6 is a view similar to FIG. 3 showing the use of a box rather than the T slot of FIG. 3.
Figure 6A:
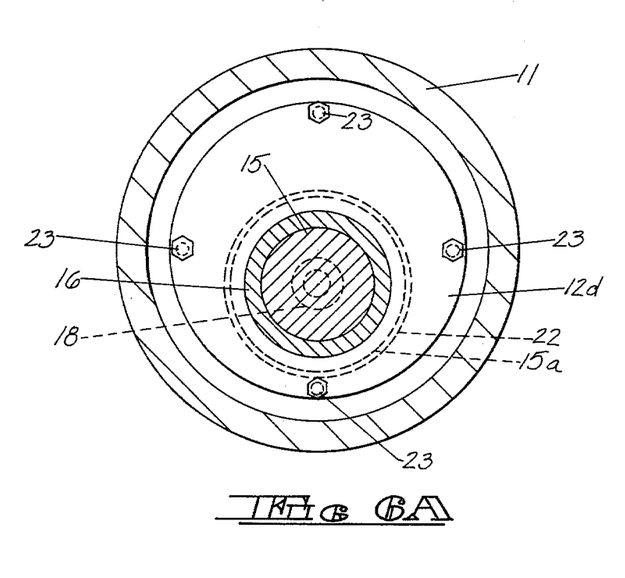
FIG. 6A is a cross sectional view taken on the line 6A—6A of FIG. 6.

Similarly, in FIG. 6 the box may be in the form of a cylindrical or square recess in the member 12c but in this case a retainer member 12d must be secured to the member 12c as by means of bolts 23. This structure is necessary in order to make it possible to assemble the member 15a to the member 12c.

It will be observed that in all of these cases the cylinder 15 or the ball 21 or the member 15a does not move radially but acts in the nature of a crank in cooperation with the member 12, 12a or 14, and it will be clear that the construction of FIGS. 4, 5 and 6 provides better radial support than the construction of FIGS. 1, 2 and 3.

It may be desirable to provide similar support for the tail end of the inner member and in this connection reference may be had to FIG. 7 where the inner member is indicated at 30. The tail of the inner member is supported through a thread-mounted head 31 which is preferably threaded into the center of the cross section of the inner member 30 as indicated at 32. The ball 33 is threaded into the head 31 as shown.

The only problem is that the head must be on the lathe center of the member 30 and in order to do this, it is necessary to screw in or unscrew by a small amount the member 31, as at 32, and to provide a drill hole 34 on the lathe center of the member 30 to serve as a feeler hole. A pin 35 may be passed through a drill hole in the member 31 and the member 31 may slowly be rotated until the pin 35 can enter the feeler hole 34. At this point the orientation of the member 31 will be correct on the lathe center of the member 30. To secure it in this position shims may be inserted at 36 and a locking compound may be applied to the threads. By this procedure it is assured that the ball 33 will be on the lathe center of the inner member 30. Again the ball 33 will operate preferably in a box 37 provided in a member 38 which is free to rotate as the ball 33 orbits. Ball bearings 39 between the member 38 and the plate 40 provide for radial and axial thrust. The member 33 and box 37 may be substituted by the member 15 and cheeks 14 of FIG. 1, the ball 21 and cheeks 14a of FIG. 2, or a structure similar to that of FIG. 6. It will be understood that the bearing 39 could be a conventional sealed radial/thrust bearing. The sub to which the drill stem is secured is indicated at 41. Apertures for fluid flow are provided at 42.

While the transmission structure described herein has been described without regard to the use of which it is put, it is of especially great utility in connection with earth boring, when it is used as a down-hole motor in drilling for oil or gas. In this connection, it must be borne in mind that it is a characteristic of a Moineau gear pair, that the oribital movement of the lathe axis of the inner member of the pair is in a direction opposite to the direction of rotation of the inner member. For example, if in the conventional down-hole motor application the inner member or rotor of the gear pair rotates clockwise (looking down the hole), requiring the leads of the spirals of the Moineau pair to be left-hand, the oribital direction thereof will be counterclockwise.

On the other hand, with an orbital drive as disclosed herein, the leads of the spirals of the Moineau pair should be right-hand to produce left-hand rotation, and therefore right-hand orbital direction. Otherwise the entire drill string would have to have unconventional left-hand threaded connections. This would be possible, but undesirable.

These factors become important in earth boring operations, where many lengths of drill pipe are threaded together with right-hand threads, which are conventional in the oil field industry. The motor and drill bit at the bottom of the hole may be on the lower end of several miles of drill pipe terminating at the earth's surface at a rotary table. This is shown somewhat diagrammatically in FIG. 9 where the rig is indicated generally at 50 and the rotary table is indicated at 51. The drill pipe 11 is either held from rotation or caused to rotate by means of the polygonal kelly 53 which operates in a mating aperture in the rotary table 51. A supply of so-called drilling mud is provided at 54 and pumped by means of a pump 55 through a line 56 and down through the kelly 53 into the drill pipe 11. The kelly and drill pipe are supported from a hoist by means of the hook 57. The down-hole motor is diagrammatically indicated at 58 and the drill shaft is shown at 12*a* secured to the drill bit 60.

Figure 9:
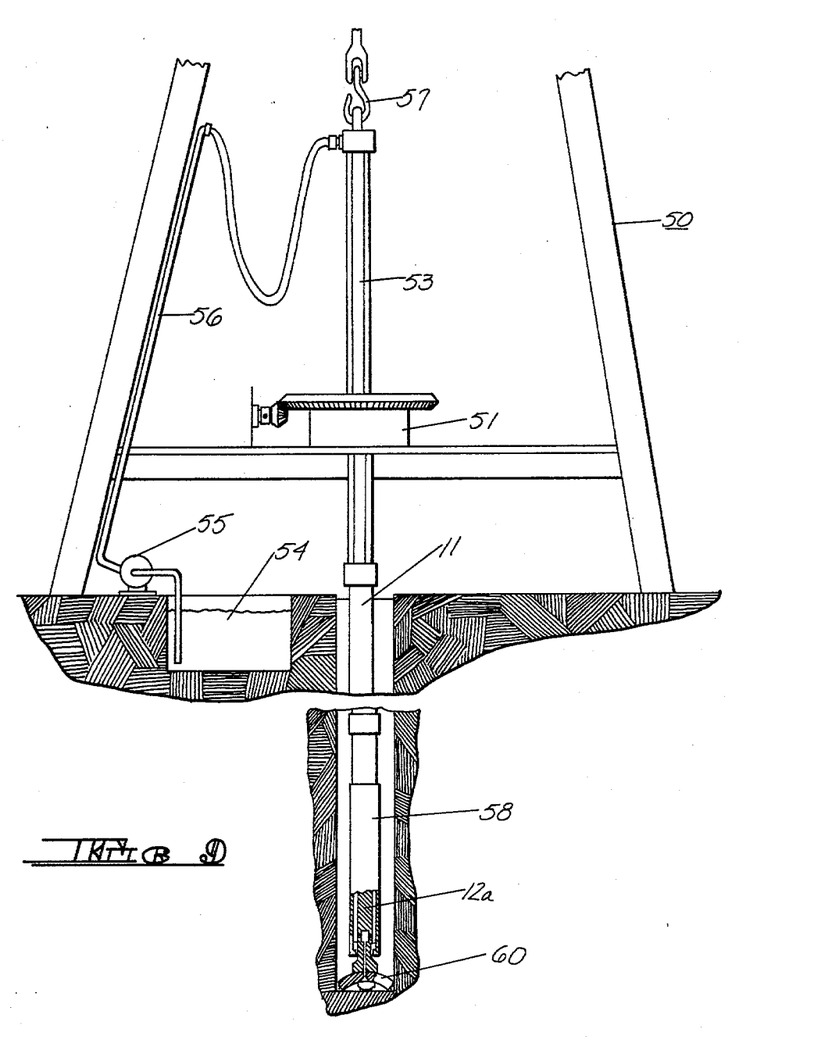
FIG. 9 is a somewhat diagrammatic view of a portion of a drilling rig showing how the various parts are used. A Rotary Table is shown diagrammatically secured to the drill string whereby the drill string may be rotated in the same or opposite direction from the drill bit for purposes to be described hereinafter.

In order to keep the conventional threads on all the lengths of drill pipe tight (and thus to prevent unscrewing), the gear pair elements must have right-hand leads of spirals, and the bit must have a right-hand thread for connection to the drill shaft 12*a*. These conditions provide for counterclockwise rotation (looking down the hole) of the rotor, and therefore a clockwise orbit of the rotor head 10 (again looking down the hole). In this way, the many lengths of drill pipe are continuously kept tight.

It is also important to know that where either element of the Moineau gear pair has one thread, and the other element has two threads, and one element is held stationary, the speed of the rotor and the orbital speed will be equal. If the elements of the gear pair have two and three threads, respectively, and one element is held stationary, the orbital speed will be twice as fast as the rotational speed of the other element, and so on, the formula being: Orbital speed=speed of rotation X the lesser number of threads on the pair.

Figure 8:
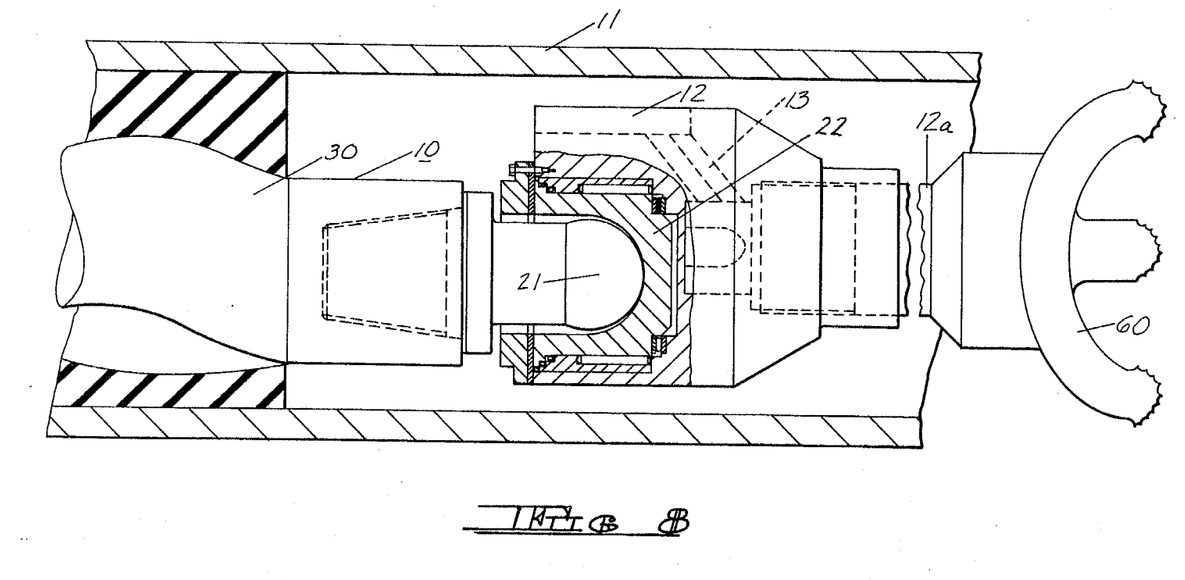
FIG. 8 is a fragmentary cross sectional view through a structure similar to that of FIG. 5 but showing the elements of the Moineau gear pair and showing also the drill shaft and drill bit as it would be used in an earth boring operation.

While the assembly of FIG. 8 has been shown with a device substantially like that shown in FIG. 5, it will be understood that the structures of any of the Figures could be used instead of that of FIG. 5.

From the foregoing description, it will be seen that the basic idea of the present invention involves a transmission construction which is unique in the development of the Moineau principle, whereby the connecting rod and double universal joints of the prior art, and the radial arm and ball arrangement of the prior art are eliminated.

It will be understood that the invention may be used where the Moineau gear pair is used as a pump. It is well known in the art that a Moineau gear pair functions as a pump when one of the members of the pair is driven, and as a motor when fluid under pressure is passed through a gear pair. Numerous modifications may be made without departing from the spirit of the invention and no limitation not specifically set forth in the claims is intended or should be implied.

What we claim is:

1. A transmission construction for transmitting power between the rotating and eccentrically gyrating inner member of a Moineau type motor, and a shaft running on true centers and driven thereby, comprising an extension on one end of said inner member disposed on its lathe axis, and a recess associated with said driven shaft, said extension entering said recess, whereby transmission of torque between said inner member and said shaft is achieved solely by the eccentric gyration of said inner member acting against said recess, a ball-and-box support for the opposite end of said inner member, said support comprising a head threadedly mounted on the said opposite end of said inner member on the center of the cross-section of said opposite end, but eccentrically of said head, said head carrying a ball on its axial center, and means for orienting said ball so that its center is on the lathe center of said inner member.

2. The construction of claim 1, wherein said means includes an axial hole on the lathe center of said inner member, and an axial hole on the center of said head, whereby said head may be rotated on the threads in said inner member until said holes are aligned, whereby said ball will be on the lathe center of said inner member.

3. The structure of claim 2, including one or more shims between said head and inner member to insure tight engagement therebetween.

* * * * *